US 12,189,937 B2

United States Patent
Artic et al.

(10) Patent No.: US 12,189,937 B2
(45) Date of Patent: Jan. 7, 2025

(54) SMART DEPICTION OF TEMPORAL NOTICES

(71) Applicant: The Boeing Company, Arlington, VA (US)

(72) Inventors: Daniel Artic, Biebesheim (DE); Nils Kneuper, Bergkamen (DE)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/312,111

(22) Filed: May 4, 2023

(65) Prior Publication Data

US 2024/0370153 A1    Nov. 7, 2024

(51) Int. Cl.
  *G06F 3/04847*  (2022.01)
(52) U.S. Cl.
  CPC ................. *G06F 3/04847* (2013.01)
(58) Field of Classification Search
  CPC .................................................. G06F 3/04847
  See application file for complete search history.

(56) References Cited

U.S. PATENT DOCUMENTS

| | | | | |
|---|---|---|---|---|
| 2006/0022845 A1* | 2/2006 | Fischer | ................. | G08G 5/045 340/945 |
| 2011/0196604 A1* | 8/2011 | Kindo | ................. | G09B 29/00 701/532 |
| 2013/0080043 A1* | 3/2013 | Ballin | ................. | G05D 1/0005 701/120 |
| 2013/0131897 A1* | 5/2013 | Simon | ................. | G05D 1/0816 701/14 |
| 2014/0358411 A1* | 12/2014 | Khoe | ................. | G01C 21/3661 701/117 |
| 2018/0068568 A1* | 3/2018 | Shorter | ................. | G08G 5/0043 |
| 2022/0374186 A1* | 11/2022 | Gatland | ................. | G06F 3/1423 |

* cited by examiner

*Primary Examiner* — Seth A Silverman
(74) *Attorney, Agent, or Firm* — Yee & Associates, P.C.

(57) ABSTRACT

A computer-implemented method of temporally depicting notices is provided. The method comprises receiving a number of notices, wherein the notices are time dependent. A user interface displays separate, respective timelines for the notices, wherein the user interface comprises a slider that moves along the timelines responsive to user input. The user interface also displays visual indicators that correspond to the notices. Responsive to movement of the slider along the timeline, the display of the visual indicators in the user interface is changed to show conditions related to the notices according to the position of the slider on the timeline.

20 Claims, 6 Drawing Sheets

SMART DEPICTION OF TEMPORAL NOTICES

BACKGROUND INFORMATION

Technical Field

The present disclosure relates generally to data management systems, and more specifically to visual depiction of notices that have a temporal quality.

Background

A Notice to Air Missions (NOTAM) is a notice issued by an aviation authority to inform pilots and other aviation personnel of information related to flight operations that affect the safety and efficiency of the airspace system. Examples of NOTAMs include runway closures, airport closures, changes in air traffic procedures, restrictions in airspace, navigation aids that are out of service, and other information used to plan and execute flights.

Therefore, it would be desirable to have a method and apparatus that take into account at least some of the issues discussed above, as well as other possible issues.

SUMMARY

An illustrative embodiment provides a computer-implemented method of temporally depicting notices. The method comprises receiving a number of notices, wherein the notices are time dependent. A user interface displays separate, respective timelines for the notices, wherein the user interface comprises a slider that moves along the timelines responsive to user input. The user interface also displays visual indicators that correspond to the notices. Responsive to movement of the slider along the timeline, the display of the visual indicators in the user interface is changed to show conditions related to the notices according to the position of the slider on the timeline.

Another illustrative embodiment provides a system for temporally depicting notices. The system comprises a storage device that stores program instructions and one or more processors operably connected to the storage device and configured to execute the program instructions to cause the system to: receive a number of notices, wherein the notices are time dependent; display, in a user interface, separate, respective timelines for the notices, wherein the user interface comprises a slider that moves along the timelines responsive to user input; display, in the user interface, visual indicators that correspond to the notices; and responsive to movement of the slider along the timeline, change display of the visual indicators in the user interface to show conditions related to the notices according to the position of the slider on the timeline.

Another illustrative embodiment provides a computer program product for temporally depicting notices. The computer program product comprises a computer-readable storage medium having program instructions embodied thereon to perform the steps of: receiving a number of notices, wherein the notices are time dependent; displaying, in a user interface, separate, respective timelines for the notices, wherein the user interface comprises a slider that moves along the timelines responsive to user input; displaying, in the user interface, visual indicators that correspond to the notices; and responsive to movement of the slider along the timeline, changing display of the visual indicators in the user interface to show conditions related to the notices according to the position of the slider on the timeline.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that NOTAMs often have a temporal component and are only valid during that timeframe. It is common practice to merely mark the respective area as affected and leave the sorting out of the impact to dispatcher and pilot.

The illustrative embodiments also recognize and take into account that NOTAMs are usually shown only as markings or overlays on a map if any graphical depiction is available, but there is not time aspect visualized in such a display.

The illustrative embodiments provide temporal depiction of NOTAMs to provide visual indication of which areas are affected and when. This method is applicable to both airport as well as airspace enroute. The illustrative embodiments provide the temporal view using a schedule and allow users to scroll through the timeline of the schedule to see the aviation elements affected by the NOTAMs highlighted in the map and how the map might change at different times according to the NOTAM schedules.

Figure 1:
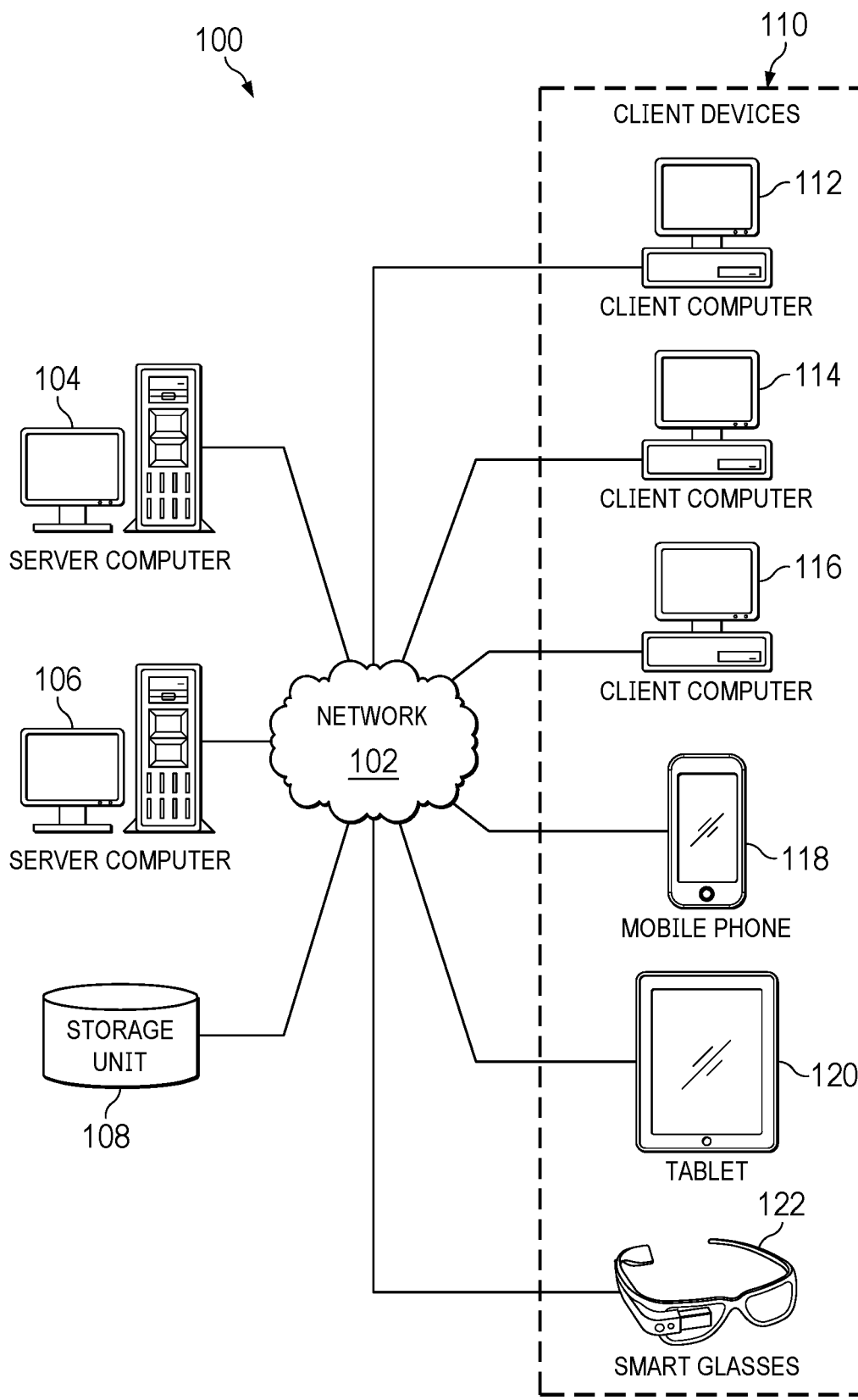
FIG. 1 is a pictorial representation of a network of data processing systems in which illustrative embodiments can be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
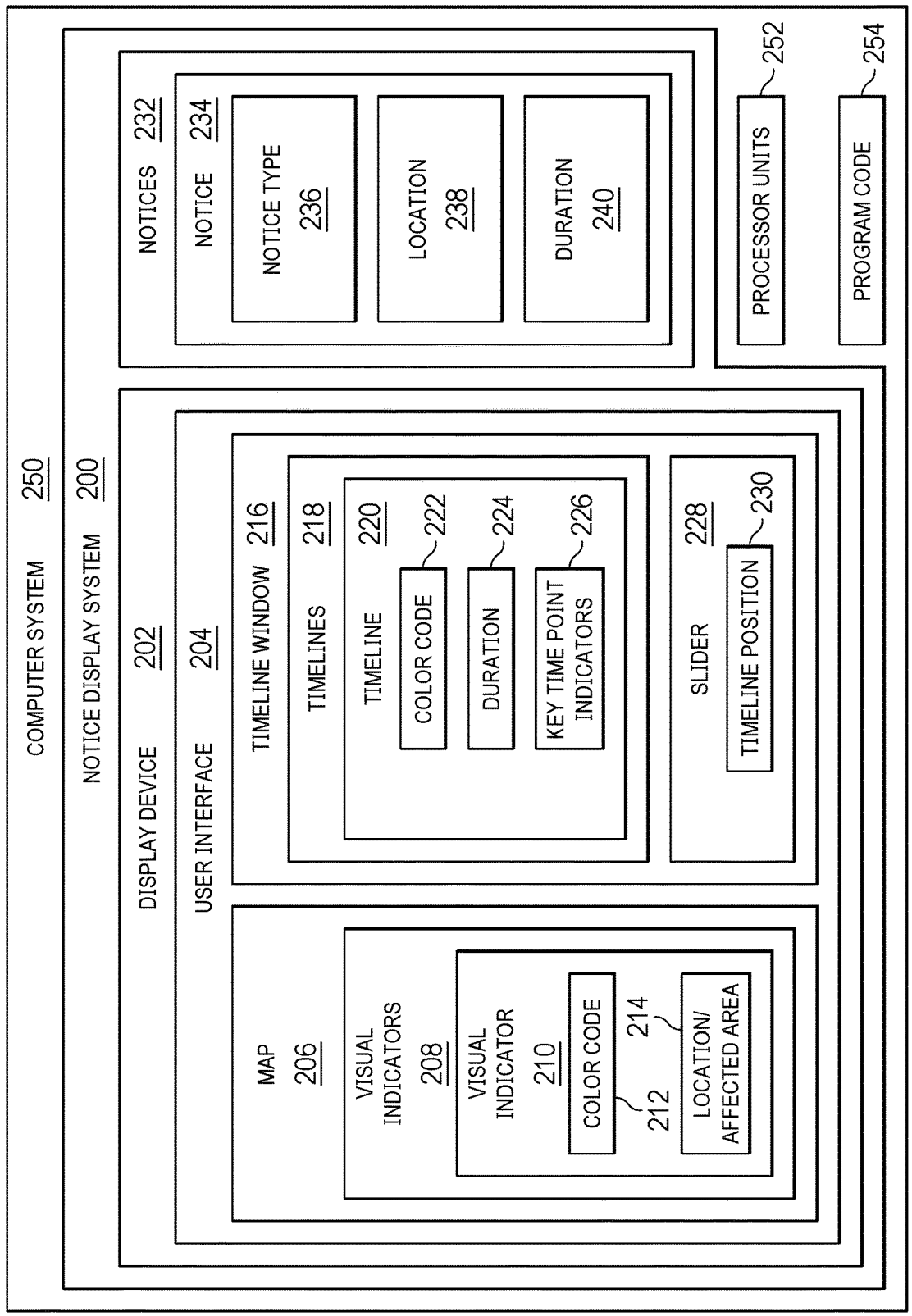
FIG. 2 is an illustration of a block diagram of a notice display system in accordance with an illustrative embodiment.

With reference now to FIG. 2, an illustration a block diagram of a notice display system is depicted in accordance with an illustrative embodiment. In this illustrative example, notice display system 200 includes components that can be implemented in hardware such as the hardware shown in network data processing system 100 in FIG. 1.

Notice display system 200 receives a number of notices 232 such as, e.g., a Notice to Air Missions (NOTAM). Each notice 234 has a notice type 236. For example, notice 234 might be for a complete closure (e.g., for a runway) or just an operational limitation. Notice 234 applies to a particular location 238 and has a duration 240, which might be temporary or indefinite.

Notice display system 200 provides information to a user in a user interface 204 generated by display device 202. Display device 202 is a physical hardware system that might be part of an electronic flight bag (EFB) which is an electronic information management system that assists flight crews in performing flight management tasks. User interface 204 can be a graphical user interface.

The display device 202 can include at least one of a light emitting diode (LED) display, a liquid crystal display (LCD), an organic light emitting diode (OLED) display, a computer monitor, a projector, a flat panel display, a heads-up display (HUD), a head-mounted display (HMD), or some other suitable device that can output information for the visual presentation of information.

User interface displays a map 206 on which are projected a number of visual indicators 208 corresponding to notices 232. Each visual indicator 210 might have a color code 212 corresponding to the notice type 236 for that notice. The visual indicator 210 designates the location or affected area 214 on the map to which the corresponding notice 234 applies. For example, the location/affected area 214 might be a runway or area of an airport or could be a section of airspace enroute.

It should be noted that notice display system 200 might employ image types other than map 206 to display the visual indicators 208. For example, visual indicators 208 might be displayed on a ticker display or a plain satellite image.

User interface 204 also displays a timeline window 216 that includes a number of timelines 218. Each timeline 220 corresponds to a specific visual indicator 210 and notice 234. Timeline 220 has a color code 222 that matches the color code 212 of the corresponding visual indicator 210, allowing easy visual cross-reference by a user. The timeline 220 denotes and visualizes the duration 224 that the notice is in effect. The timeline 220 can also display key time point indicators 226. These key time points might include, e.g., current time, estimated time of arrival, scheduled time of arrival, estimated time of departure, scheduled time of departure, and estimated time at location.

Timeline window 216 might include a slider 228 that can be moved along the timelines 218 through user input. When the slider 228 is moved to a given timeline position 230, user interface 204 will alter map 206 to display the visual indicators 208 that are in effect at the point in time corresponding to the timeline position 230. The slider 228 allows the user to see future conditions at specific points of time rather than just current conditions.

Notice display system 200 can be implemented in software, hardware, firmware, or a combination thereof. When software is used, the operations performed by notice display system 200 can be implemented in program code configured to run on hardware, such as a processor unit. When firmware is used, the operations performed by notice display system 200 can be implemented in program code and data and stored in persistent memory to run on a processor unit. When hardware is employed, the hardware can include circuits that operate to perform the operations in notice display system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
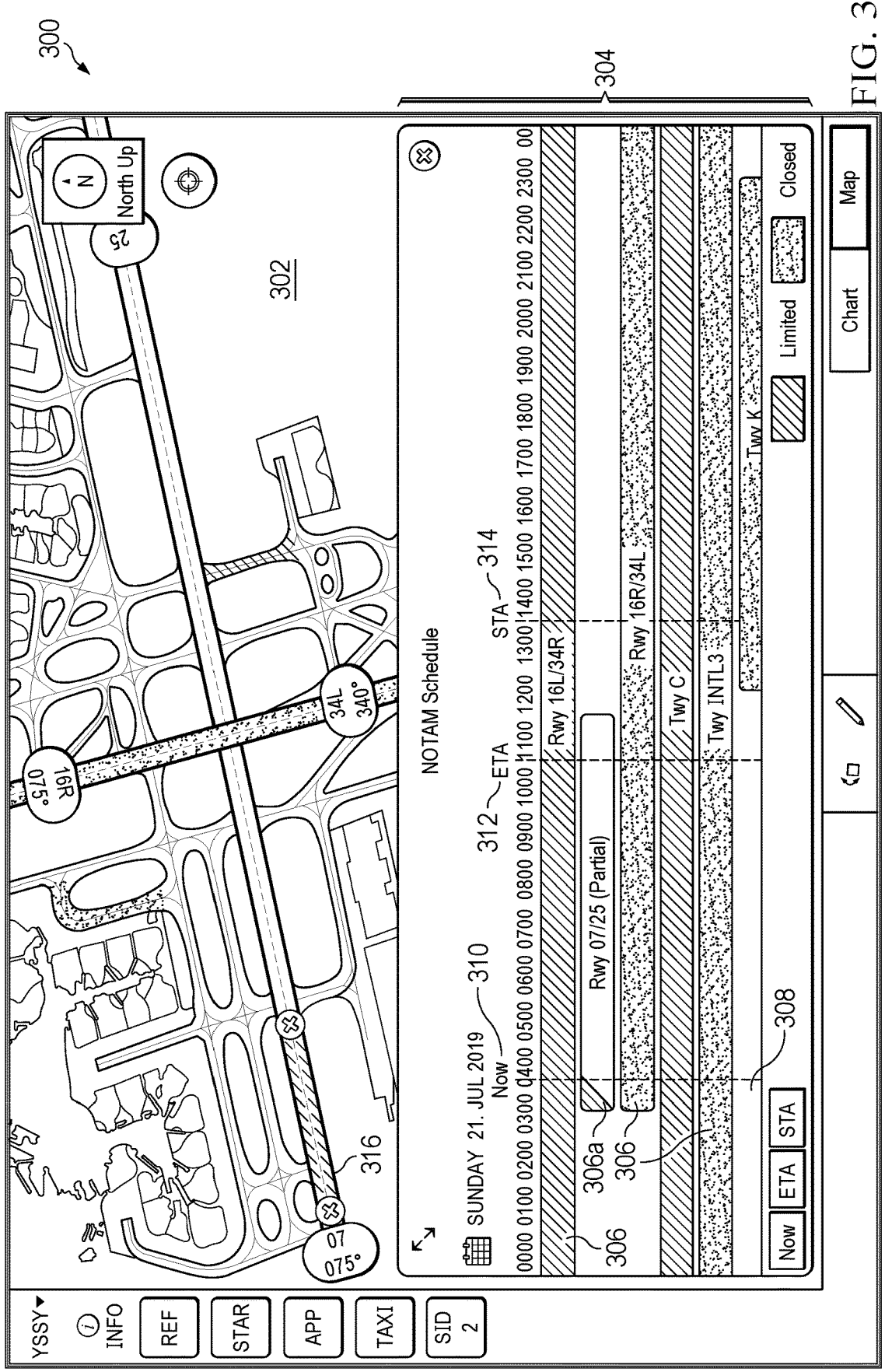
FIG. 3 depicts a pictorial illustration of a notice display user interface showing a partial runway closure in accordance with an illustrative embodiment.

FIG. 3 depicts a pictorial illustration of a notice display user interface showing a partial runway closure in accordance with an illustrative embodiment. User interface 300 is an example of user interface 204 in FIG. 2.

In the present example, user interface 300 includes a time bar 304 shown at the bottom. It should be noted that time bar 304 can be located in any position within user interface 300. Time bar 304 is an example of timeline window 216 in FIG. 2.

The time bar 304 shows a separate "swim lane" 306 for each NOTAM. A swim lane refers to a series of activities related to a particular process, e.g., maintenance or repair. Using a movable slider 308, the user can move along the time bar 304 to jump to the operationally relevant times for a selected flight. In the case of a pilot, the operationally relevant times would be for the currently viewed flight. In the case of dispatch, the operationally relevant times would relate to currently selected/planned flight. In the present example, time bar 304 displays markings for "now" 310, "estimated time of arrival" (ETA) 312, as well as "scheduled time of arrival" (STA) 314.

Colorized items from the schedule/time bar 304 are highlighted in map 302 in the same color. In the present example, the coloring distinguishes between a closure of an element (e.g., runway, taxiway, airways for enroute, etc.) or a limitation of parameters. Examples of parameters might include weight limits for runways/taxiways and limits on "takeoff only" in the case of runways. Partial closures of elements are indicated by only marking the affected area. Therefore, in the present example, only a section of Runway 07/25 316 is marked with the color corresponding to swim lane 306a in time bar 304 to indicate the partial closure.

If the full element is not visible on the map 302, user interface 300 marks the element as far as the screen is visible to indicate that the element goes beyond the visible screen.

Using slider 308 the user is able to jump to different times along time bar 304, which can alter the markings on the map 302 and change their color according to the status of the NOTAMs at that time. If a NOTAM is not active at the selected time, no marking is shown on map 302.

Figure 4:
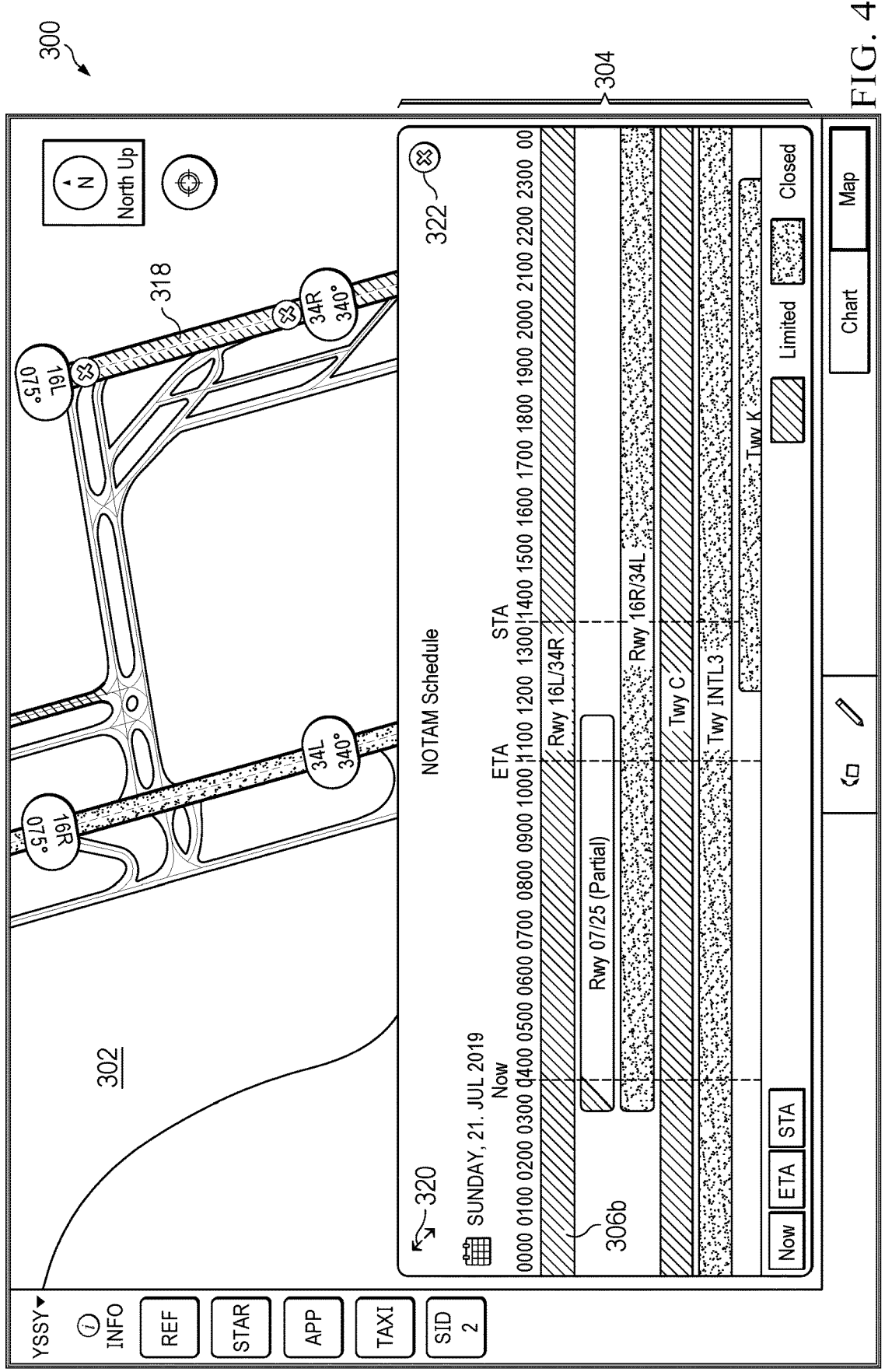
FIG. 4 depicts a pictorial illustration of a notice display user interface showing a full runway closure in accordance with an illustrative embodiment.

FIG. 4 depicts a pictorial illustration of a notice display user interface showing a full runway closure in accordance with an illustrative embodiment. FIG. 4 illustrates a different view of map 302 in FIG. 3.

In this example, the user has scrolled down map 302 to better visualize Runway 16L/34R 318, which was obscured in the view shown in FIG. 3. As shown in FIG. 4, the entirety of Runway 16L/34R 318 is marked closed, corresponding to swim lane 306b in the time bar 304.

Time bar 304 can be expanded or reduced with expand icon 320 or closed and removed from display in user interface 300 with close icon 322.

Figure 5:
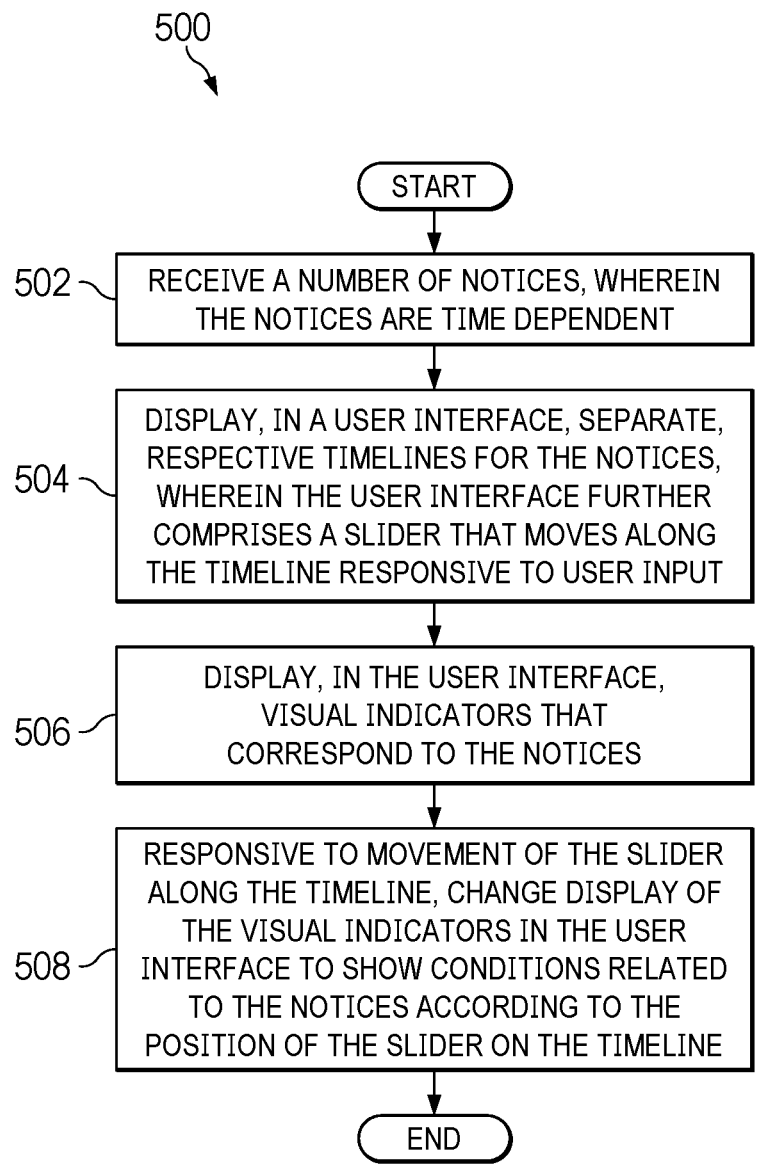
FIG. 5 depicts a flowchart of a process for temporally displaying notices in accordance with an illustrative embodiment.

FIG. 5 depicts a flowchart of a process for temporally depicting notices in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in notice display system 200 in computer system 250 in FIG. 2.

Process 500 begins by receiving a number of notices, wherein the notices are time dependent (operation 502). The notices might comprise notices to air missions (NOTAMs).

Separate, respective timelines for the notices are displayed in a user interface (operation 504). The user interface comprises a slider that moves along the timeline responsive to user input. The timelines can be displayed as time bars in the user interface. The user interface might be incorporated into an electronic flight bag (EFB).

Visual indicators that correspond to the notices are displayed in the user interface (operation 506). The user interface might display airport conditions affected by the notices. The user interface might also display enroute conditions affected by the notices. For example, the user interface might display restricted airspace and whether the restriction is indefinite or temporary.

The timelines and corresponding visual indicators might be color matched. The timelines and visual indicators might also be color coded according to notice content.

Responsive to movement of the slider along the timeline, display of the visual indicators in the user interface is changed to show conditions related to the notices according to the position of the slider on the timeline (operation 508).

Process 500 then ends.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
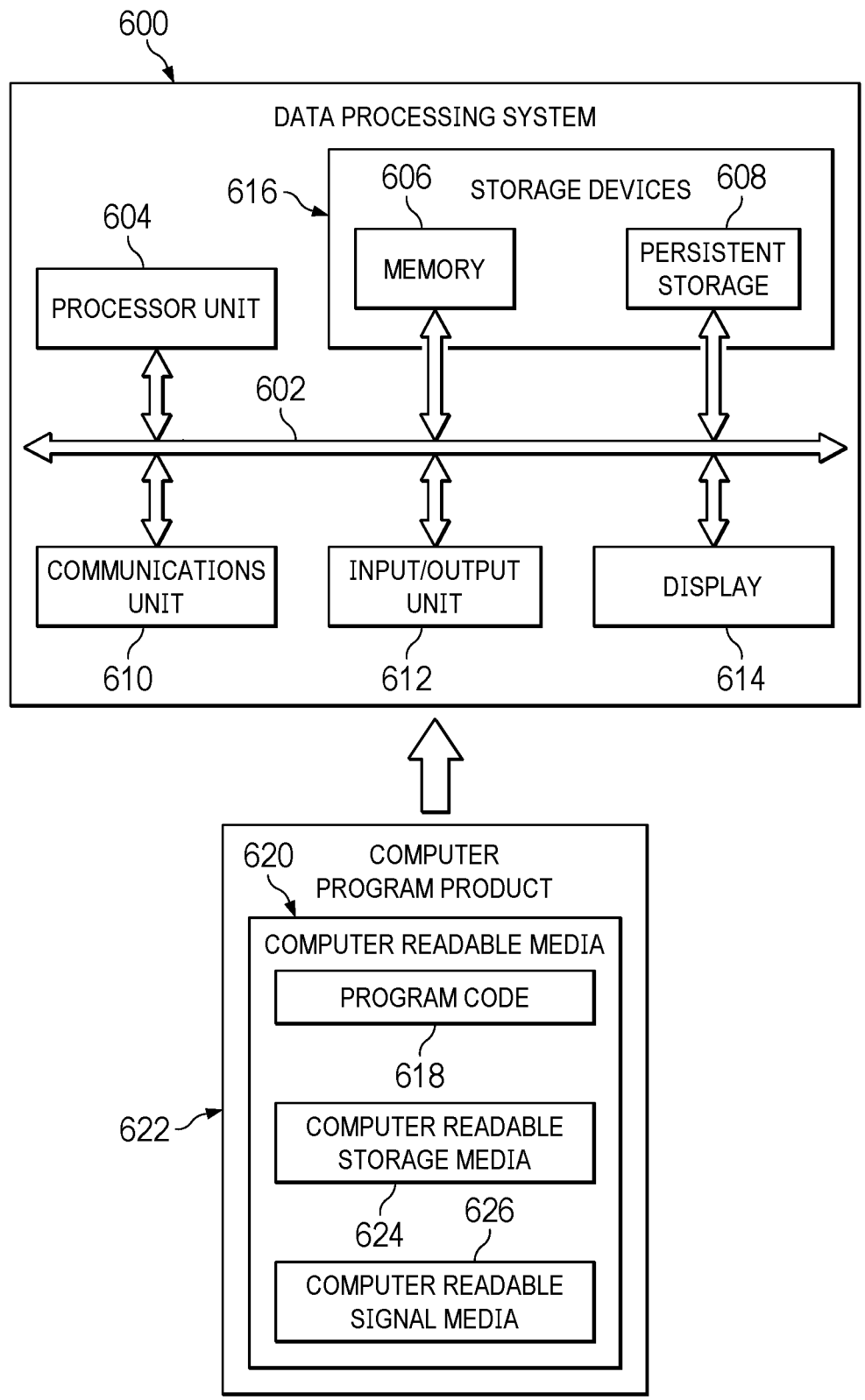
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement server computers 104 and 106 and client devices 110 in FIG. 1, as well as computer system 250 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general-purpose central processing units (CPUs). In an alternate embodiment, processor unit 604 comprises one or more graphical processing units (GPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Computer readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of temporally depicting notices, the method comprising:
   using a number of processors to perform the operations of:
   receiving a number of notices issued by an aviation authority that at least partially limit aircraft operations in specific locations, wherein each notice applies to a particular location and has a duration for which the notice is in effect;
   displaying, in a user interface, separate, respective timelines of schedules for the notices, wherein the user interface comprises a slider that moves along the timelines of the schedules responsive to user input;
   displaying, in the user interface, visual indicators on a map or image that designate locations or areas to which the notices apply; and
   responsive to movement of the slider along the timeline, changing display of the visual indicators that are in effect at the point in time corresponding to the timeline position in the user interface to show conditions related to the notices according to the position of the slider on the timeline, thereby allowing the user to see future conditions at specific points of time according to the schedules for the notices.

2. The method of claim 1, wherein the timelines and corresponding visual indicators are color matched.

3. The method of claim 1, wherein the timelines and visual indicators are color coded according to notice content.

4. The method of claim 1, wherein the timelines indicate:
   current time;
   estimated time of arrival;
   scheduled time of arrival;
   estimated time of departure;
   scheduled time of departure; and
   estimated time at location.

5. The method of claim 1, wherein the user interface displays airport conditions affected by the notices.

6. The method of claim 1, wherein the user interface displays en route conditions affected by the notices.

7. The method of claim 6, wherein the user interface displays restricted airspace.

8. The method of claim 1, wherein the timelines are displayed as time bars in the user interface.

9. The method of claim 1, wherein the notices comprise notices to air missions (NOTAMs).

10. The method of claim 1, wherein the user interface is incorporated into an electronic flight bag (EFB).

11. A system for temporally depicting notices, the system comprising:
    a storage device that stores program instructions;
    one or more processors operably connected to the storage device and configured to execute the program instructions to cause the system to:
    receive a number of notices issued by an aviation authority that at least partially limit aircraft operations in specific locations, wherein each notice applies to a particular location and has a duration for which the notice is in effect;
    display, in a user interface, separate, respective timelines of schedules for the notices, wherein the user interface comprises a slider that moves along the timelines of the schedules responsive to user input;
    display, in the user interface, visual indicators on a map or image that designate locations or areas to which the notices apply; and
    responsive to movement of the slider along the timeline, change display of the visual indicators that are in effect at the point in time corresponding to the timeline position in the user interface to show conditions related to the notices according to the position of the slider on the timeline, thereby allowing the user to see future conditions at specific points of time according to the schedules for the notices.

12. The system of claim 11, wherein the timelines and corresponding visual indicators are color matched.

13. The system of claim 11, wherein the timelines and visual indicators are color coded according to notice content.

14. The system of claim 11, wherein the timelines indicate:
    current time;
    estimated time of arrival;
    scheduled time of arrival;
    estimated time of departure;
    scheduled time of departure; and
    estimated time at location.

15. The system of claim 11, wherein the user interface displays airport conditions affected by the notices.

16. The system of claim 11, wherein the user interface displays en route conditions affected by the notices.

17. The system of claim 11, wherein the timelines are displayed as time bars in the user interface.

18. The system of claim 11, wherein the notices comprise notices to air missions (NOTAMs).

19. The system of claim 11, wherein the user interface is incorporated into an electronic flight bag (EFB).

20. A computer program product for temporally depicting notices, the computer program product comprising:
   a computer-readable storage medium having program instructions embodied thereon to perform the steps of:
      receiving a number of notices issued by an aviation authority that at least partially limit aircraft operations in specific locations, wherein each notice applies to a particular location and has a duration for which the notice is in effect;
      displaying, in a user interface, separate, respective timelines of schedules for the notices, wherein the user interface comprises a slider that moves along the timelines of the schedules responsive to user input;
      displaying, in the user interface, visual indicators on a map or image that designate locations or areas to which the notices apply; and
      responsive to movement of the slider along the timeline, changing display of the visual indicators that are in effect at the point in time corresponding to the timeline position in the user interface to show conditions related to the notices according to the position of the slider on the timeline, thereby allowing the user to see future conditions at specific points of time according to the schedules for the notices.

* * * * *